(12) United States Patent
Zeitlin et al.

(10) Patent No.: US 9,491,189 B2
(45) Date of Patent: Nov. 8, 2016

(54) REVIVAL AND REDIRECTION OF BLOCKED CONNECTIONS FOR INTENTION INSPECTION IN COMPUTER NETWORKS

(71) Applicant: Guardicore Ltd., Tel Aviv (IL)

(72) Inventors: Ariel Zeitlin, Kfar Saba (IL); Pavel Gurvich, Tel Aviv (IL)

(73) Assignee: Guardicore Ltd., Tel Aviv (IL)

( * ) Notice: Subject to any disclaimer, the term of this patent is extended or adjusted under 35 U.S.C. 154(b) by 7 days.

(21) Appl. No.: 14/262,750

(22) Filed: Apr. 27, 2014

(65) Prior Publication Data

US 2015/0058983 A1 Feb. 26, 2015

Related U.S. Application Data

(60) Provisional application No. 61/869,840, filed on Aug. 26, 2013.

(51) Int. Cl.
*G06F 11/00* (2006.01)
*H04L 29/06* (2006.01)

(52) U.S. Cl.
CPC ............... *H04L 63/1408* (2013.01)

(58) Field of Classification Search
CPC ......... H04W 12/00; G06F 21/30; H04L 9/00
USPC ......... 726/22-23, 11; 713/185-187; 370/390
See application file for complete search history.

(56) References Cited

U.S. PATENT DOCUMENTS

| | | | |
|---|---|---|---|
| 6,654,882 B1* | 11/2003 | Froutan | H04L 63/1416 713/153 |
| 7,159,149 B2* | 1/2007 | Spiegel et al. | 714/43 |
| 7,251,215 B1* | 7/2007 | Turner et al. | 370/231 |
| 7,363,656 B2* | 4/2008 | Weber et al. | 726/23 |
| 7,383,578 B2* | 6/2008 | Blake et al. | 726/23 |
| 7,610,375 B2* | 10/2009 | Portolani | H04L 63/0218 709/224 |
| 7,712,143 B2* | 5/2010 | Comlekoglu | G06F 21/53 713/181 |
| 7,725,938 B2* | 5/2010 | Cothrell | H04L 63/1408 726/13 |
| 7,937,761 B1* | 5/2011 | Bennett | H04L 63/1433 713/153 |
| 8,045,457 B1* | 10/2011 | Satish | H04L 65/607 370/230 |
| 8,112,801 B2* | 2/2012 | Abdel-Aziz | H04L 63/1425 713/160 |
| 8,140,694 B2* | 3/2012 | Johnson | H04L 63/1491 709/203 |
| 8,181,250 B2* | 5/2012 | Rafalovich et al. | 726/23 |
| 8,413,216 B2 | 4/2013 | Hughes et al. | |
| 8,526,433 B2* | 9/2013 | Kini et al. | 370/390 |
| 8,683,584 B1* | 3/2014 | Daswani | G06F 21/577 726/22 |

(Continued)

OTHER PUBLICATIONS

Intrusion detection in wireless ad hoc network, A. Mishra, Feb. 2004, IEEE, vol. 11, pp. 48-60.*

(Continued)

*Primary Examiner* — Andrew Nalven
*Assistant Examiner* — Viral Lakhia
(74) *Attorney, Agent, or Firm* — D. Kligler IP Services Ltd.

(57) ABSTRACT

A method for network security includes monitoring traffic exchanged over a computer network. A failed attempt to communicate with a target computer by an initiating computer is identified in the monitored traffic. The identified failed attempt is revived by establishing an investigation connection with the initiating computer while impersonating the target computer. Verification is made as to whether the failed attempt was malicious or innocent, by communicating with the initiating computer over the investigation connection.

22 Claims, 5 Drawing Sheets

(56) References Cited

U.S. PATENT DOCUMENTS

| | | | | |
|---|---|---|---|---|
| 8,713,668 | B2* | 4/2014 | Cooper | H04L 63/0227 726/11 |
| 8,892,766 | B1* | 11/2014 | Wei | H04L 67/2814 706/22 |
| 8,955,122 | B2* | 2/2015 | Gu | G06F 21/552 370/238 |
| 8,990,938 | B2* | 3/2015 | Huston et al. | 726/22 |
| 9,038,151 | B1* | 5/2015 | Chua | H04L 45/02 709/223 |
| 2003/0137930 | A1* | 7/2003 | Futernik | 370/216 |
| 2003/0236995 | A1 | 12/2003 | Fretwell, Jr. | |
| 2008/0046989 | A1* | 2/2008 | Wahl | G06F 21/55 726/7 |
| 2008/0289028 | A1* | 11/2008 | Jansen et al. | 726/11 |
| 2009/0044270 | A1* | 2/2009 | Shelly | H04L 63/14 726/22 |
| 2009/0073895 | A1* | 3/2009 | Morgan | H04L 63/0227 370/255 |
| 2009/0172788 | A1 | 7/2009 | Vedula et al. | |
| 2009/0328192 | A1* | 12/2009 | Yang | H04L 12/4641 726/15 |
| 2011/0067107 | A1* | 3/2011 | Weeks | G06F 21/55 726/23 |
| 2011/0191847 | A1* | 8/2011 | Davis | G06F 15/16 726/22 |
| 2012/0254951 | A1 | 10/2012 | Munetoh et al. | |
| 2013/0179879 | A1 | 7/2013 | Zhang et al. | |
| 2013/0269033 | A1* | 10/2013 | Amaya Calvo et al. | 726/23 |
| 2013/0276091 | A1* | 10/2013 | Saxena | H04L 63/029 726/11 |
| 2014/0115706 | A1 | 4/2014 | Silva et al. | |
| 2014/0181968 | A1* | 6/2014 | Ge et al. | 726/23 |
| 2014/0181972 | A1* | 6/2014 | Karta et al. | 726/23 |
| 2015/0156086 | A1 | 6/2015 | Chesla et al. | |
| 2016/0019388 | A1 | 1/2016 | Singla et al. | |

OTHER PUBLICATIONS

Prevelakis et al., "Sandboxing Applications", Proceedings of the FREENIX Track, USENIX Annual Technical Conference, 8 pages, year 2001.
Goldberg et al., "A Secure Environment for Untrusted Helper Applications: Confining the Wily Hacker", Proceedings of the Sixth USENIX UNIX Security Symposium, 14 pages, Jul. 1996.
Polychronakis et al., "Comprehensive Shellcode Detection using Runtime Heuristics", Proceedings of the 26th Annual Computer Security Applications Conference, 10 pages, Dec. 2010.
Wicherski et al., "Efficient Bytecode Analysis: Linespeed Shellcode Detection", 11 pages, Mar. 2011.
OpenFlow Switch Specification, Version 1.1.0 Implemented (Wire Protocol 0x02), 56 pages, Feb. 28, 2011.
CISCO, "One Platform Kit (onePK) for Developers", Data sheet, 1 page, Mar. 2014.
InfiniBand Architecture Specification, vol. 1, Release 1.2.1, 1727 pages, Nov. 2007.
U.S. Appl. No. 14/726,544 Office Action dated Sep. 21, 2016.

* cited by examiner

REVIVAL AND REDIRECTION OF BLOCKED CONNECTIONS FOR INTENTION INSPECTION IN COMPUTER NETWORKS

CROSS-REFERENCE TO RELATED APPLICATIONS

This application claims the benefit of U.S. Provisional Patent Application 61/869,840, filed Aug. 26, 2013, whose disclosure is incorporated herein by reference.

FIELD OF THE INVENTION

The present invention relates generally to network security, and particularly to methods and systems for investigating blocked communication sessions.

BACKGROUND OF THE INVENTION

Various security techniques are known in the art for detecting and mitigating attacks on computer networks. For example, U.S. Pat. No. 8,181,250, whose disclosure is incorporated herein by reference, describes a personalized honeypot for detecting information leaks and security breaches. The honeypot is configured for use with computing resources such as desktop and network resources such as address book contacts, instant messaging contacts, active directory user accounts, IP addresses, and files that contain particular content or that are stored in particular locations. The resources may be real for which protection against leakage is desired, or fake to operate as bait to lure and detect malicious attacks.

U.S. Pat. No. 7,383,578, whose disclosure is incorporated herein by reference, describes techniques for morphing a honeypot system on a dynamic and configurable basis. The morphing honeypot emulates a variety of services while falsely presenting information about potential vulnerabilities within the system that supports the honeypot. The morphing honeypot has the ability to dynamically change its personality or displayed characteristics using a variety of algorithms and a database of known operating system and service vulnerabilities. The morphing honeypot personality can be changed on a timed or scheduled basis, on the basis of activity that is generated by the presented honeypot personality, or on some other basis.

U.S. Patent Application Publication 2012/0254951, whose disclosure is incorporated herein by reference, describes a system including a detection unit configured to detect unauthorized access to one or more information processing apparatuses that are virtually implemented by virtual machines executed by a computer. An authorized network is configured to transfer authorized access to the one or more information processing apparatuses from an external network. A honeypot network is configured to transfer unauthorized access to the information processing apparatuses from the external network. A control unit is configured to connect the information processing apparatuses for which no unauthorized access has been detected to the authorized network, and to connect the information processing apparatuses for which unauthorized access has been detected to the honeypot network. The control unit shifts, in response to detecting unauthorized access by the detection unit, the corresponding information processing apparatus into a decoy mode in which the detected unauthorized access is disconnected from a normal operation.

U.S. Pat. No. 8,413,216, whose disclosure is incorporated herein by reference, describes techniques for simulating a large, realistic computer network. Virtual actors statistically emulate the behaviors of humans using networked devices or responses and automatic functions of networked equipment, and their stochastic actions are queued in buffer pools by a behavioral engine. An abstract machine engine creates the minimal interfaces needed for each actor, and the interfaces then communicate persistently over a network with each other and real and virtual network resources to form realistic network traffic. The network can respond to outside stimuli, such as a network mapping application, by responding with false views of the network in order to spoof hackers, and the actors can respond by altering a software defined network upon which they operate.

SUMMARY OF THE INVENTION

An embodiment of the present invention that is described herein provides a method for network security. The method includes monitoring traffic exchanged over a computer network. A failed attempt to communicate with a target computer by an initiating computer is identified in the monitored traffic. The identified failed attempt is revived by establishing an investigation connection with the initiating computer while impersonating the target computer. Verification is made as to whether the failed attempt was malicious or innocent, by communicating with the initiating computer over the investigation connection.

In some embodiments, identifying the failed attempt includes detecting that the attempt has been blocked by a security system. In other embodiments, identifying the failed attempt includes detecting that the attempt has failed for attempting to access a nonexistent destination.

In a disclosed embodiment, reviving the identified failed attempt includes detecting a packet that is sent to the initiating computer and declines the attempt, and preventing the detected packet from reaching the initiating computer. In another embodiment, reviving the identified failed attempt includes redirecting the revived attempt to an investigation module that establishes the investigation connection and impersonates the target computer.

Identifying the failed attempt may include detecting that no reply was sent in response to the attempt within a predefined time period, detecting that the attempt has been retried, and/or detecting that a connection-reset or port-unreachable message has been sent in response to the attempt. Additionally or alternatively, identifying the failed attempt may include receiving a notification of the failed attempt from a security or management system of the computer network.

In another embodiment, identifying the failed attempt includes predicting that the attempt will fail before actual failure of the attempt. in an embodiment, reviving the identified failed attempt includes sending to the initiating computer a positive reply that appears to originate from the target computer.

There is additionally provided, in accordance with an embodiment of the present invention, a system for network security including one or more interfaces and one or more processors. The interfaces are configured to connect to a computer network. The processors are configured to monitor traffic exchanged over the computer network, to identify in the monitored traffic a failed attempt by an initiating computer to communicate with a target computer, to revive the identified failed attempt by establishing an investigation connection with the initiating computer while impersonating the target computer, and to verify whether the failed attempt was malicious or innocent by communicating with the initiating computer over the investigation connection.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for securing computer networks. In some disclosed embodiments, a security system detects failed attempts to communicate with servers in a secured network. A communication attempt may have failed, for example, because it is blocked by a firewall or other security measure, or because it attempts to access a nonexistent target, e.g., service or server. The system investigates such failed attempts in order to classify them as malicious or innocent.

In a typical implementation, the system identifies an unsuccessful attempt by an initiating server to communicate with a target server in the secured network. The system revives the failed attempt, and starts communicating with the initiating server while impersonating the target server. The system uses the communication with the initiating server to investigate the nature of the failed communication attempt, and in particular decide whether it is malicious or innocent.

In some embodiments, the system comprises one or more detection and revival modules (DRMs) and an investigation module (IVG). The DRMs identify failed communication attempts, revive them and redirect them seamlessly to the IVG for investigation. The IVG communicates with the initiating servers by impersonating the target servers. The revival and redirection process is transparent to the initiating server, which is fooled to believe it communicates with the intended target server. A management module (MNG) configures and manages the system operation and interacts with an administrator. Several example techniques for detecting and reviving failed communication attempts are described in details below.

Unlike conventional security measures and platforms, the disclosed techniques revive and investigate communication attempts that have already been blocked or otherwise failed. As such, the disclosed techniques are highly effective in identifying security threats in their early stages, e.g., in the network mapping stage before the actual attack. Moreover, the disclosed techniques can be used to complement conventional security measures, which focus on blocking and usually take no further action once a communication attempt has been blocked.

System Description

Figure 1:
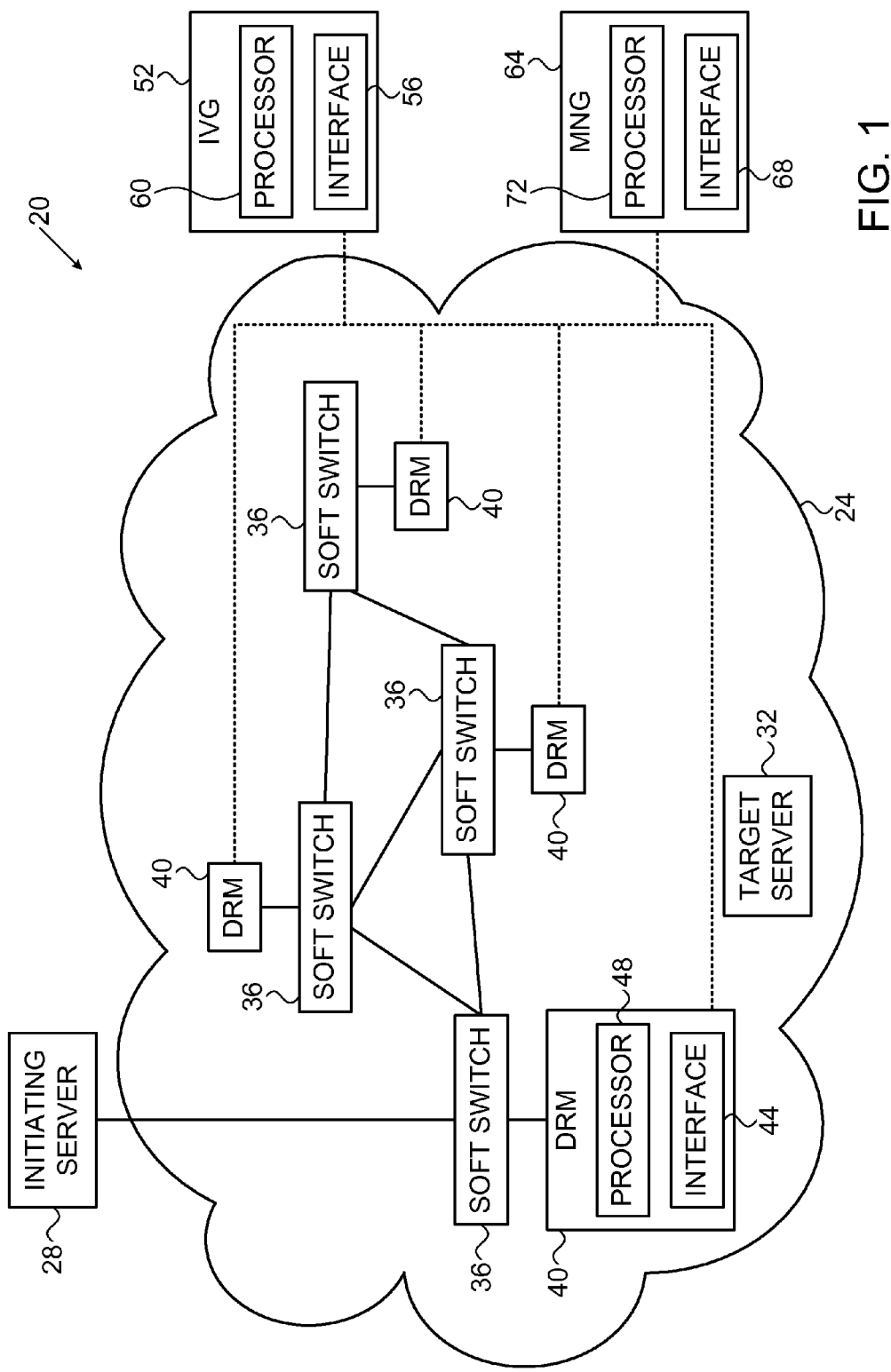
FIG. 1 is a block diagram that schematically illustrates a system for securing a computer network, in accordance with an embodiment of the present invention.

FIG. 1 is a block diagram that schematically illustrates a system 20 for securing a computer network 24, in accordance with an embodiment of the present invention. As will be explained in detail below, system 20 detects blocked or otherwise failed attempts by some initiating server 28 to communicate with a target server in network 24, revives the failed attempt and continues to communicate with initiating server 28, so as to investigate whether the communication attempt is malicious or innocent.

Network 24 may comprise, for example, a data center, an enterprise network of an organization, or any other suitable network. Network 24 typically comprises a packet network such as an Internet Protocol (IP) network. Initiating server 28 and target server 32 may comprise any suitable type of computer or computing platform.

In the embodiment of FIG. 1, network 24 comprises multiple soft switches 36 that are interconnected with one another in a certain topology, and connect the various computers of the network (not shown in the figure for clarity). Target server typically comprises one of the computers connected to soft switches 36.

In the present example, system 20 comprises multiple detection and revival modules (DRMs) 40, an investigation module (IVG) 52 and a management module (MNG) 64. Each DRM may be implemented, for example, as a virtual machine (VM), as an extension to the respective soft switch 36, or as software running on a suitable server or computer. Generally, DRMs 40 detect failed communication attempts and redirect them for investigation by IVG 52.

The IVG may comprise, for example, a "honeypot" that detects malicious activity caused by a connection. MNG 64 manages the operation of system 20 and interacts with outside users, e.g., an administrator. Each node of system 20 comprises an interface for connecting to network 24 and a processor for carrying out the various tasks of than node. Each DRM 40 comprises an interface 44 and a processor 48, IVG 52 comprises an interface 56 and a processor 60, and MNG 64 comprises an interface 68 and a processor 72.

The configurations of system 20 and network 24 shown in FIG. 1 are example configurations, which are chosen purely for the sake of conceptual clarity. In alternative embodiments, any other suitable configurations can be used. For example, in FIG. 1, the DRMs are distributed over network 24 such that each DRM is coupled to a respective soft switch 36. Each DRM in this scheme handles connections in the network segment that is accessible to its respective soft switch. In alternative embodiments, system 20 may comprise any suitable number of DRMs, not necessarily having one-to-one association with the soft switches, or even a single centralized DRM.

Furthermore, the division of functions described herein among DRMs 40, IVG 52 and MNG 64 is depicted purely by way of example. In alternative embodiments, the functions of system 20 (e.g., detection, revival, redirection, investigation and management) may be performed using any other suitable elements, or even by a single unit.

The configuration of network 24 is also provided purely by way of example, and the disclosed techniques can be used to secure various other networks. For example, network 24 may not necessarily be virtualized, i.e., may not necessarily comprise soft switches. in some embodiments, network 24 comprises a Software-Defined Network (SDN), in which switches 36 are controlled and configured by a centralized controller.

The different elements of DRMs 40, IVG 52 and MNG 64 may be implemented using any suitable hardware, such as in an Application-Specific Integrated Circuit (ASIC) or Field-Programmable Gate Array (FPGA). Alternatively, the various elements of DRMs 40, IVG 52 and MNG 64 can be implemented using software, or using a combination of hardware and software elements.

In some embodiments, processors 48, 56 and/or 72 comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Detection, Revival, Redirection and Investigation of Failed Connection Attempts

As explained above, system 20 detects unsuccessful attempts by initiating servers 28 to communicate with target servers 32. Communication attempts (also referred to as connection attempts) may fail for various reasons, for example because the connection is blocked by a security measure such as a firewall appliance, a personal firewall appliance, a switch or router having an access list rule, or a switch enforcing virtual local-area network (VLAN) separation.

A connection attempt may also fail because it attempts to connect to a nonexistent target, e.g., a nonexistent destination address or a port that is not being listened to in the target server. Further alternatively, a communication attempt may fail for any other suitable reason. The disclosed techniques are able to detect and investigate any such failed connection attempt. In the present context, the terms "unsuccessful attempt," "failed attempt" and "blocked attempt" are used interchangeably.

Figure 2:
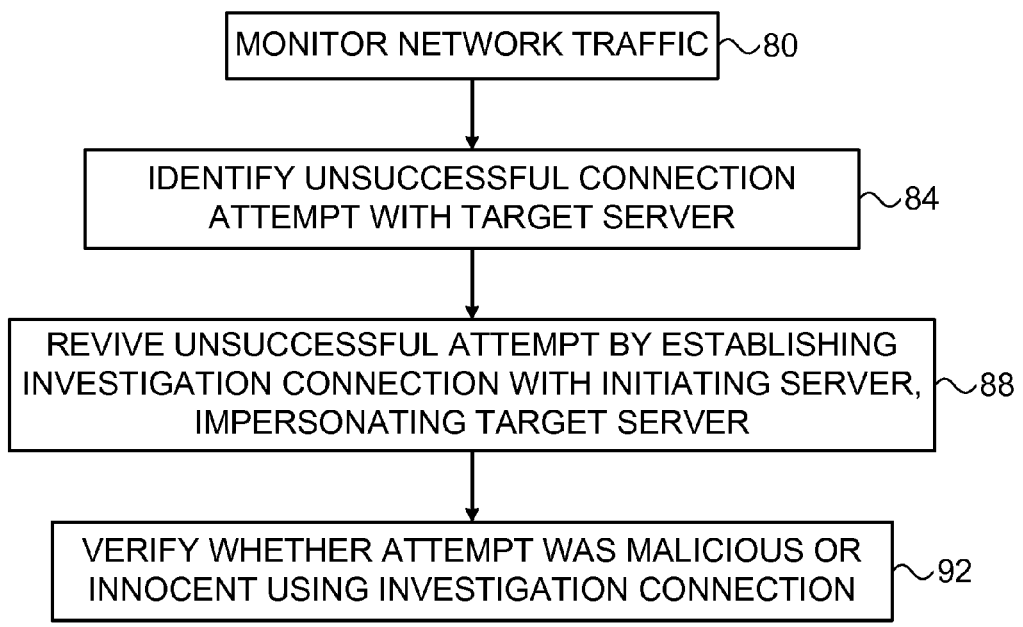
FIG. 2 is a flow chart that schematically illustrates a method for network security, in accordance with an embodiment of the present invention.
Figure 3:
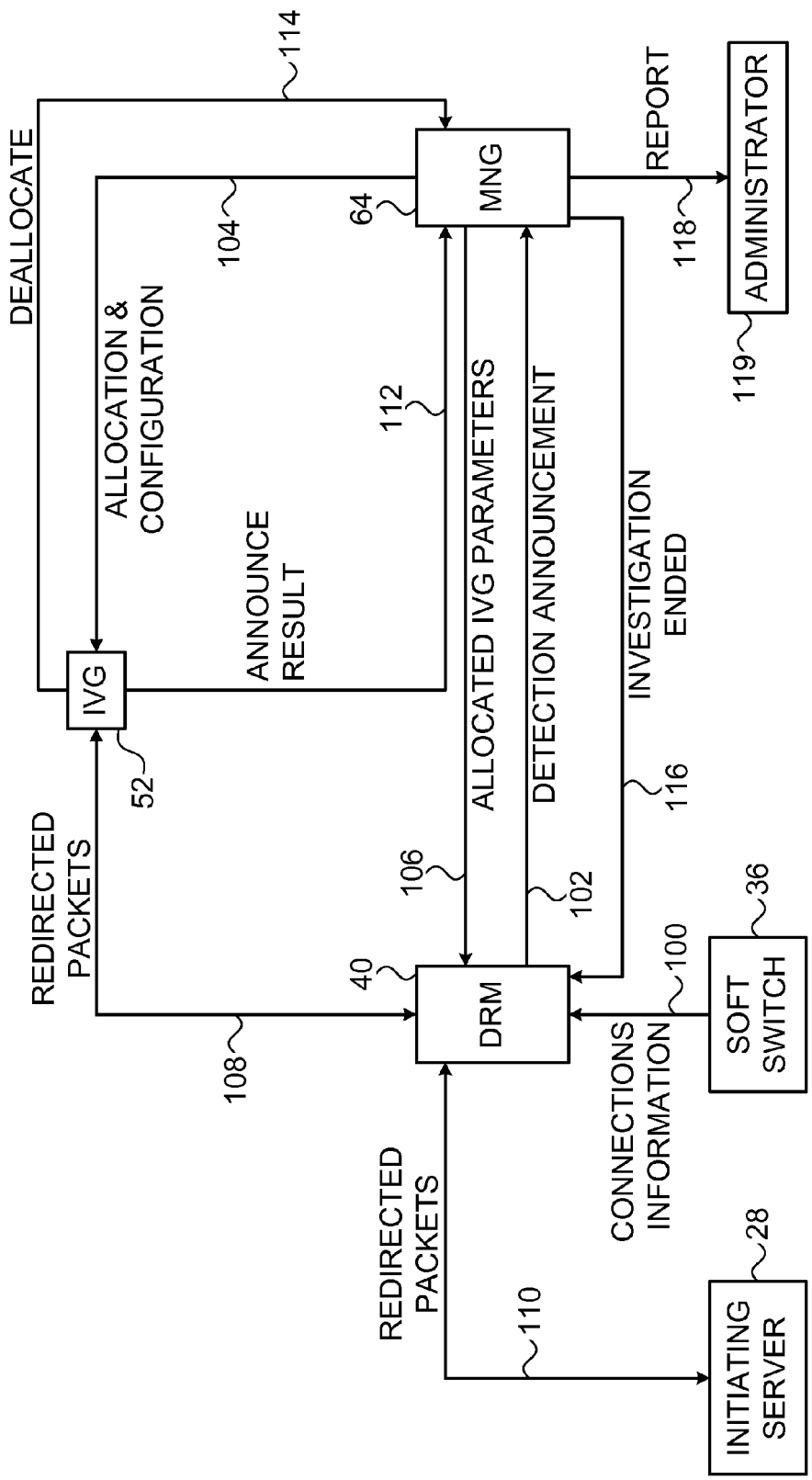
FIG. 3 is a diagram showing a flow of operations in a system for securing a computer network, in accordance with an embodiment of the present invention.

FIG. 2 is a flow chart that schematically illustrates a method for network security, in accordance with an embodiment of the present invention. A corresponding flow of operations, including the interaction between the DRMs, IVG and MNG, is shown in FIG. 3 further below. The method of FIG. 2 begins with DRMs 40 monitoring traffic in network 24, at a monitoring step 80. At some stage, one of DRMs 40 detects an unsuccessful attempt by an initiating server to connect to a target server, at an attempt detection step 84.

In response to the detection, the DRM revives the unsuccessful connection attempt, at a revival step 88. The DRM redirects the connection to IVG 52. IVG 52 continues to communicate with the initiating server, impersonating the target server. The IVG investigates the attempt and verifies whether it is innocent or malicious, at an investigation step 92. The investigation results are typically reported to MNG 64, which in turn may report them to an administrator.

FIG. 3 is a diagram showing a flow of operations in system 20, in accordance with an embodiment of the present invention. The figure illustrates the interaction among DRM 40, IVG 52 and MNG 64 while responding to a detected unsuccessful connection attempt.

The process begins with DRM 40 receiving from soft switch 36 information regarding connection attempts in network 24 (marked by an arrow 100). The DRM may receive connection information in various ways, depending, among other factors, on the configuration of network 24.

For example, network 24 may be configured to pass all incoming and outgoing traffic of switches 36 via DRMs 40. This technique is sometimes referred to as service insertion. As another example, switches 36 may be configured to mirror all incoming and outgoing traffic to the DRMs. The former implementation allows the DRM to change packets in the traffic, for example to delete connection reset or denial packets that are sent to the initiating server, whereas the latter implementation does not.

In yet another embodiment, when network 24 comprises a Software-Defined Network (SDN), a centralized SDN controller that controls the network may be configured to forward relevant session parts to the DRMs as needed. In an SDN-based network, the DRMs, IVG and/or MNG may be implemented as one or more applications running above or in the controller.

In another embodiment, Each DRM is implemented as an extension of the respective soft switch 36, e.g., in the Hyper-V virtualization environment, such that is has access to the traffic traversing the switch. Further alternatively, DRMs 40 may obtain information regarding connection attempts from switches 36 in any other suitable way.

The DRM examines the connection attempts and detects the attempts that have failed. Example methods for detecting failed attempts among the reported attempts are described below. Upon detecting a failed connection attempt, DRM 40 announces the detection to MNG 64 and requests allocation of resources of in IVG 52 (announcement and request marked by an arrow 102). In response, MNG 64 allocates resources of IVG 52 for investigating the connection attempt, and configures the IVG accordingly (marked by an arrow 104). MNG 64 sends parameters or other details of the allocated IVG resources to the relevant DRM (marked by an arrow 106).

DRM 40 then seamlessly revives the failed connection, using techniques that are described below. The DRM establishes a path over which packets are redirected between initiating server 28 and IVG 52 (marked by arrows 108 and 110). The redirected connection between the initiating server and the IVG is referred to herein as an investigation connection.

The redirection and establishing of the investigation connection are performed in a manner that is undetectable by the initiating server. In particular, the IVG communicates with the initiating server while impersonating the identity of the target server that the initiating server attempted to contact. For example, the IVG may use the target server's IP address, Medium Access Control (MAC) address, port number, service, protocol, and/or any other suitable identifier or parameter. In an example embodiment, the IVG executes the exact service (e.g., same executable) that the initiating server expects.

By communicating with the initiating server and analyzing the investigation connection, the IVG is able to decide whether the connection attempt was malicious (e.g., a cyber attack) or not. Upon making a decision, IVG 52 updates MNG 64 with the investigation results (marked by an arrow 112). The MNG de-allocates the IVG resources (marked by an arrow 114), and informs the DRM that the investigation has ended (marked with an arrow 116). Finally, the MNG issues a detailed report of the investigation to an administrator 119.

In some embodiments, communication of the redirected packets between DRM 40 and IVG 52 is performed using packet encapsulation. In other words, the DRM encapsulates each packet received from the initiating server (over the path marked 110) before sending the packet to the IVG (over the path marked 108), and the IVG de-capsulates the packet on reception. In the opposite direction, the IVG encapsulates each packet to be sent to the initiating server, and sends the encapsulated packet to the DRM (over the path marked 108). The DRM de-capsulates the packet and forwards it to the initiating server.

Any suitable type of encapsulation or tunneling protocol can be used for this purpose, such as, for example, using a dedicated VLAN trunk, Generic Routing Encapsulation (GRE), Point-to-Point Tunneling Protocol (PPTP). In some embodiments, each DRM uses a dedicated encapsulation tunnel (e.g., a unique VLAN) vis-à-vis the IVG. In some embodiments, communication among the various elements of system 20 (DRMs 40, IVG 52 and MNG 64) is performed using such encapsulation.

Example Failed Connection Detection Methods

DRM 40 may use various techniques for detecting failed connection attempts. Some detection techniques do not require or assume cooperation with other security platforms that may exist in network 24. For example, the DRM may detect that no reply to the connection attempt was observed for more than a predefined time out period. Alternatively, the DRM may detect that initiating server 28 sent a Transmission Control Protocol (TCP) retry, implying that it did not receive a reply to a preceding TCP connection request.

As another example, the DRM may detect a RST (reset connection) packet that is received following a TCPSYN (TCP synchronization) request packet sent by the initiating server. The RST packet is assumed to have been transmitted by a firewall or other security system that decided to block the connection attempt.

In another example, the DRM may detect a timeout on an ICMP#7 (ping) request. Additionally or alternatively, the DRM may detect an ICMPPORTUNREACHABLE message received on a User Datagram Protocol (UDP) connection request.

In yet another example embodiment, the DRM may detect an Address Resolution Protocol (ARP) request by an initiating server that is not answered, and interpret this event as an attempt to contact a nonexistent server. In a typical scenario, before accessing the target server, the initiating server sends an ARP-WHO-HAS request that specifies the requested IP address. If the ARP-WHO-HAS request is not answered, the DRM may identify this event as a failed connection attempt, and reply with the MAC address of the allocated IVG. From this point the initiating server will connect to the IVG by itself. The DRM may identify an unanswered ARP-WHO-HAS request, for example, by detecting that the request is not answered within a specified time period, or by detecting that the initiating server retries the request.

Other techniques for detecting unsuccessful connection attempts use some form of cooperation or integration with a security system, e.g., firewall or Security Information and Event Management (SIEM) system, in network 24. When using such techniques, the DRM may not need to analyze the connection attempt itself. For example, the DRM may receive from a firewall information regarding connections that the firewall has blocked.

In an example implementation, system 20 uses a combination of the two types of techniques (independent techniques and techniques that interact with other security systems) in order to comprehensively cover failed connections of different types and reasons. Further alternatively, system 20 may use any other suitable method for detecting failed connection attempts.

Figure 4:
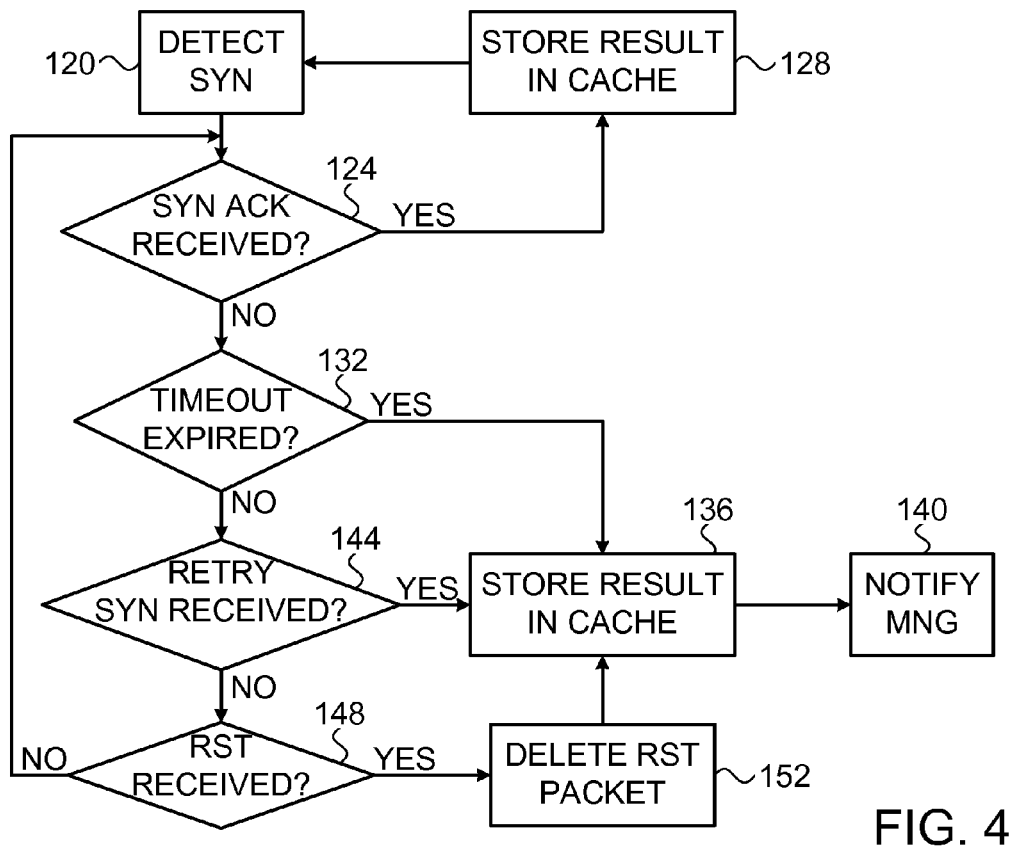
FIG. 4 is a flow chart that schematically illustrates a method for identifying an unsuccessful Transmission Control Protocol (TCP) connection attempt, in accordance with an embodiment of the present invention.

FIG. 4 is a flow chart that schematically illustrates a method for identifying an unsuccessful TCP connection attempt, in accordance with an embodiment of the present invention. The method begins with DRM 40 detecting a SYN (synchronization request) sent from an initiating server to a target server in network 24, at a SYN detection step 120.

DRM 40 checks whether a SYN ACK (acknowledgement for the SYN packet) was received from the target server, at an ACK checking step 124. If a SYN ACK was received, the DRM stores the relevant information in a cache log, at a caching step 128, and the method loops back to step 120. Otherwise, the DRM checks whether a timeout period set for the SYN ACK has expired, at a timeout expiry checking step 132. If the timeout period has expired, the DRM concludes that the connection attempt has failed. Consequently, the DRM caches the information in the cache log, at a failure caching step 136, and reports the failed connection attempt to MNG 64, at a failure reporting step 140.

If the timeout period has not expired, the DRM checks whether a retry SYN packet was received, at a retry checking step 144. If so, the DRM again concludes that the connection attempt has failed, caches the information in the cache log at step 136, and reports the failed connection attempt to MNG 64 at step 140.

If no retry SYN packet was received, the DRM checks whether an RST (reset connection packet) was received, at an RST checking step 148. If so, the DRM concludes that the connection was blocked by some security system, which generated the RST packet. In response, the DRM deletes the RST packet, at a deletion step 152. The DRM then caches the relevant information in the cache log at step 136, and reports the failed connection attempt to MNG 64 at step 140. If no RST packet was received, the method loops back to step 124 above.

FIG. 4 demonstrates that, in some embodiments, DRM 40 detects and deletes connection reset packets that are sent en-route to the initiating server. This deletion is necessary in order to enable the DRM to revive the failed connection and redirect it to IVG 52.

Figure 5:
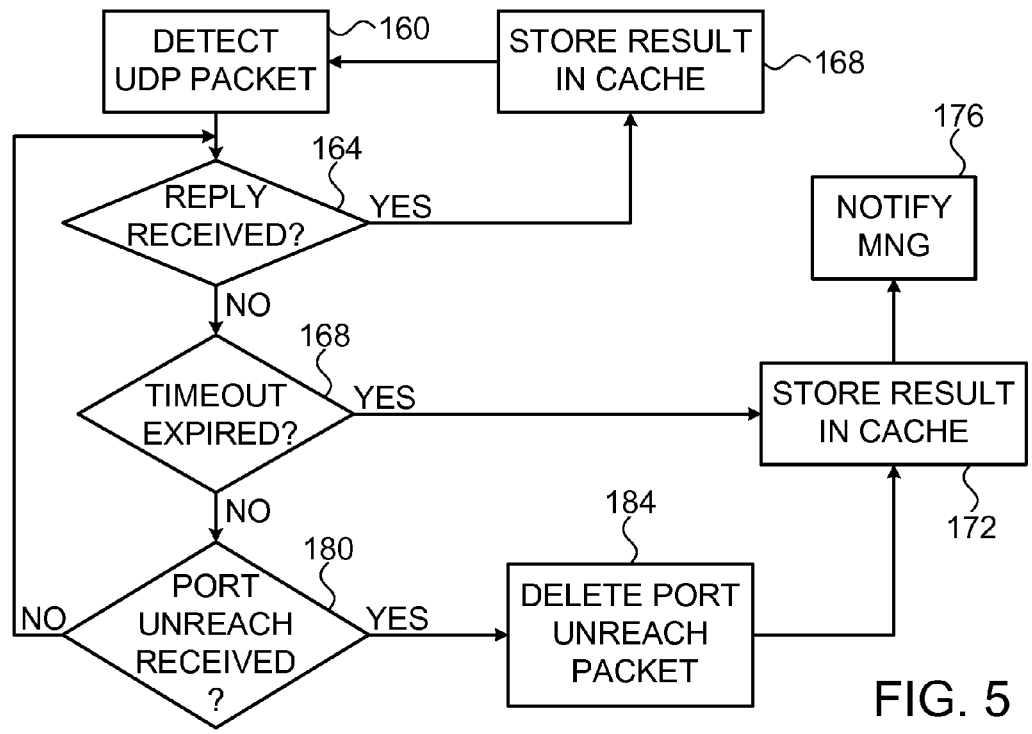
FIG. 5 is a flow chart that schematically illustrates a method for identifying an unsuccessful User Datagram Protocol (UDP) connection attempt, in accordance with an embodiment of the present invention.

FIG. 5 is a flow chart that schematically illustrates a method for identifying an unsuccessful UDP connection attempt, in accordance with an embodiment of the present invention. The method begins with DRM 40 detecting a UDP packet from an initiating server to a target server in network 24, at a UDP detection step 160.

The DRM checks whether a reply from the target server to the UDP packet was received, at a reply checking step 164. If so, the DRM caches the information in the cache log, at a caching step 168, and the method loops back to step 160. Otherwise, the DRM check whether a timeout period set for the reply has expired, at a timeout expiry checking step 168. If the timeout period has expired, the DRM concludes that the connection attempt has failed. Consequently, the DRM caches the information in the cache log, at a failure caching step 172, and reports the failed connection attempt to MNG 64, at a failure reporting step 176.

If the timeout period has not expired, the DRM checks whether a "Port unreachable" (ICMPPORTUNREACHABLE) packet was received in response to the UDP packet, at a ICMPPORTUNREACHABLE checking step 180. If so, the DRM concludes that the connection attempt has failed. In response, the DRM deletes the ICMPPORTUNREACHABLE packet, at a ICMPPORTUNREACHABLE deletion step 184. By deleting the ICMPPORTUNREACHABLE packet, the DRM prevents this packet from reaching the initiating server, in order to enable subsequent revival of the connection. If no ICMPPORTUNREACHABLE packet is detected, the method loops back to step 164 above.

The flows of FIGS. 4 and 5 are example flows that demonstrate several possibilities for detecting failed TCP and UDP connection attempt. In alternative embodiments, any other suitable flow can be used. Similar flows can be defined for other connection types.

In some embodiments, DRM 40 is able to predict which connection attempts are likely to fail based on the connection attempts alone, before the actual blocking or other failure occurs. For example, the DRM may study the network structure and use this information to predict connection attempt failures. For example, the DRM may hold a list of valid servers or services, and use this list for identifying attempts to connect to nonexistent servers or services. As another example, the DRM may receive some or all of the network security policy (e.g., from an administrator), and predict that connection attempt violating the policy will fail. Additionally or alternatively, any other suitable prediction scheme can be used.

Example Connection Revival and Redirection Methods

In some embodiments, upon detecting an unsuccessful connection attempt, DRM 40 sends a fake positive reply to the initiating server (and/or prevents a connection termination packet from reaching the initiating server), and then redirects the packets arriving from the initiating server to IVG 52 allocated by MNG 64. From this point, the allocated IVG takes over and carries out an investigation session with the initiating server over the revived connection.

Figure 6:
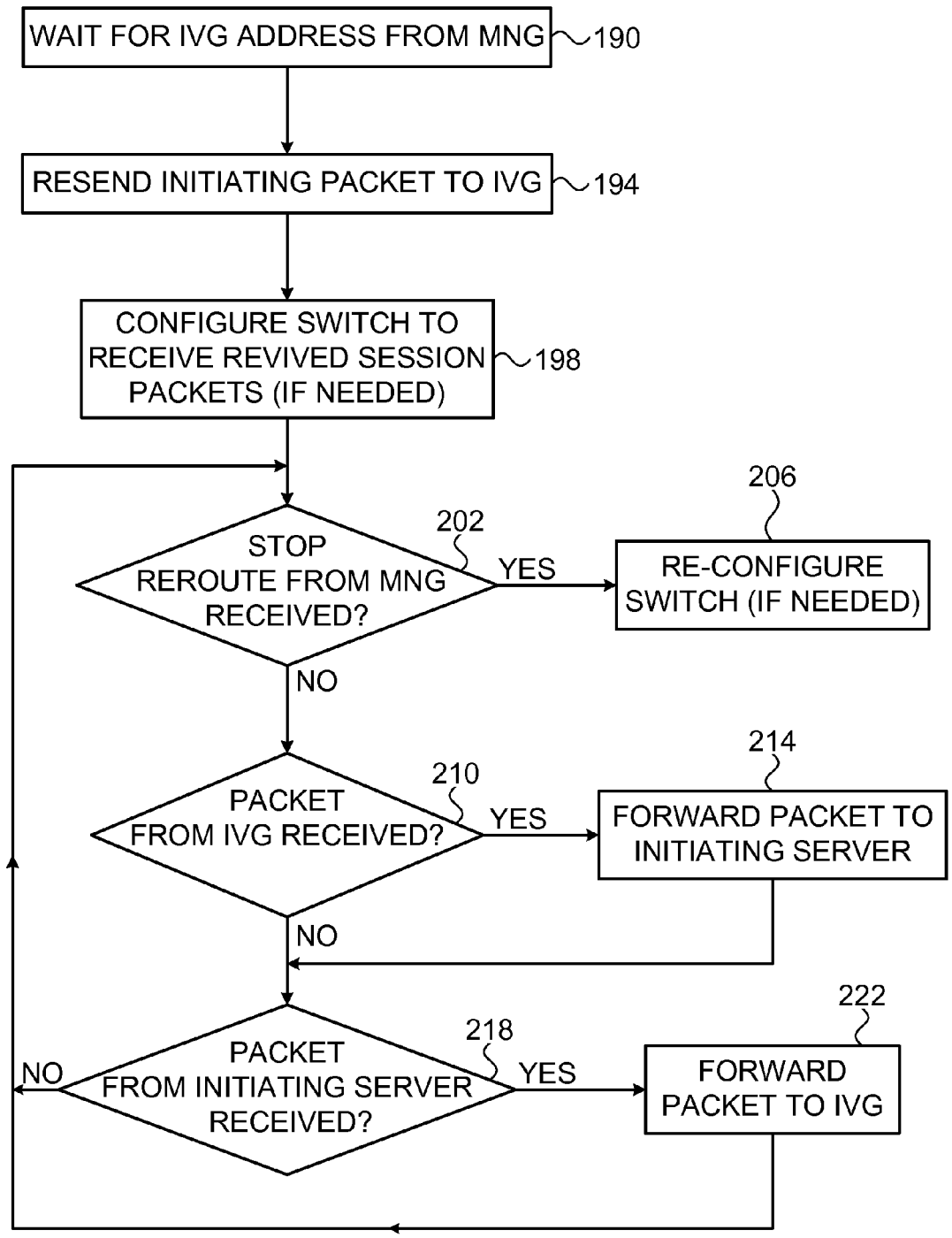
FIG. 6 is a flow chart that schematically illustrates a method for session revival and redirection, in accordance with an embodiment of the present invention.

FIG. 6 is a flow chart that schematically illustrates a method for session revival and redirection, in accordance with an embodiment of the present invention. The method begins with DRM 40 waiting for a notification from MNG 64, which indicates the IP address of the IVG 52 that was allocated to the connection in question, at an address allocation step 190.

Upon receiving the allocated IVG IP address, the DRM resends the initiating packet (the packet from the initiating server that requests the connection) to the IVG, at a re-initiation step 194. Typically, The DRM encapsulates the initiating packet, so as to allow it to be transferred as-is over network 24 and de-capsulated by the IVG, as explained above.

If necessary, DRM 40 configures its respective switch 36 to forward the packets of the revived session, at a switch configuration step 198. This sort of reconfiguration may be needed, for example, if the DRM was not previously exposed to all the packets, and received only the packets related to session initiation. In some embodiments, reconfiguration of switch 36 is assisted by MNG 64. In some cases it is necessary to reconfigure more than a single switch 36, for example in order to set-up a tunnel through network 24. In such cases it may be preferable for the MNG to assist or perform the reconfiguration, since the MNG has a more complete view of the network than an individual DRM.

From this point until MNG 64 indicates that the investigation is completed, DRM 40 forwards the packets received from initiating server 28 to IVG 52, and vice versa. As explained above, the connection between the DRM and IVG is typically encapsulated. In this manner, packet redirection is transparent and unnoticeable to the initiating server.

DRM 40 checks whether the MNG has announced that the investigation is completed, at a completion checking step 202. If so, the DRM may reconfigure the switch back to its original configuration (possibly assisted by the MNG), at a switch reconfiguration step 206, and the method terminates.

Otherwise, the DRM checks whether a packet was received from the IVG, at an IVG packet checking step 210. If so, the DRM de-capsulates the packet and forwards it to the initiating server, at an initiating server forwarding step 214. The DRM also checks whether a packet was received from the initiating server, at an initiating server packet checking step 218. If so, the DRM encapsulates the packet and forwards it to the IVG, at an IVG forwarding step 222. The method then loops back to step 202 above. (In an alternative embodiment, the DRM configures the switch to perform encapsulation and de-capsulation, in which case the traffic does not have to pass through the DRM.)

The flows of FIGS. 2-6 above are example flows that are depicted purely for the sake of conceptual clarity. In alternative embodiments, any other suitable flows of operations can be used for implementing the disclosed techniques.

Additional Embodiments and Variations

In some embodiments, DRM 40 maintains a log of identified failed connections and associated information. This log (referred to as a cache log in FIGS. 4 and 5) is helpful, for example, in a-priori detection of failed connections, and enables smoother and faster revival and redirection. This functionality is useful, for example, for attacks that are preceded by a network mapping phase. The log can also be used for fast clearance of certain connection attempts, without redirection to the IVG. This technique is useful, for example, in an attack that periodically attempts to connect to some nonexistent server.

In some embodiments, DRM 40 comprises logic for selectively choosing which connections to revive. For example, the DRM may decide to revive connection attempts to "high ports," are usually not used for common services in the network.

In some embodiments, the DRM sets the Time To Live (TTL) fields of the packets of the investigation (redirected) connection, such that the IVG appears to have a hop distance that matches the hop distance to the target server.

In some embodiments, network 24 uses Virtual Extensible LAN (VXLAN) or similar technology (e.g., GRE). Such schemes are commonly used, for example, in service-provider cloud environments. In a VXLAN or similar environment, the DRM operation depends on whether the packets are provided to the DRM before or after the Virtual Tunnel Endpoint (VTEP) handling. If the packets are received after the VTEP, VXLAN encapsulation is already removed, and the DRM operates as described above. If, on the other hand, the packets are delivered to the DRM with VXLAN encapsulation, the DRM should typically remove the encapsulation in order to access the actual packets. The DRM may identify the existence of VXLAN encapsulation, for example, by a special UDP port (in Cisco Nexus1000V switches, for example, this port is 8472). Since the encapsulation headers have a fixed size, removal of the encapsulation is also straightforward.

As noted above, in some embodiments network 24 comprises an SDN. System 20 may operate in various ways, depending on the SDN architecture. In one embodiment, network 24 is controlled by a centralized SDN controller. In this embodiment, some of the tasks of detecting and reviving blocked connection attempt can be performed by the controller. In some embodiments the entire DRM can be implemented as an application above the SDN controller. In other embodiments, the DRM remains as a separate unit, but packet redirection is assisted by the SDN controller.

In another possible SDN architecture, switches 36 have OpenFlow enabled, but no SDN controller is present in the network. In an embodiment, each DRM 40 may command its respective adjacent switch 36 to provide the packets needed for failed connection detection, and also for redirecting the packets of the revived connection.

In various embodiments, MNG 64 may operate in accordance with various operation cycles. In an example embodiment, the MNG maintains connections with the various DRMs 40. When one of the DRMs detects a failed connection, the detecting DRM sends a message to the MNG, requesting an allocation of an IVG to which the revived connection will be redirected. The MNG allocates one of the IVGs from the pool of available IVGs in the system. The MNG may decide to allocate the same IVG to investigate more than one revived connection.

After allocating an IVG, the MNG may decide to configure the allocated IVG for handling the revived connection. For example, the MNG may send one or more DRM parameters to the IVG, in order to allow correct handling of encapsulated packets arriving from the DRM. After the IVG has been allocated, the MNG typically notifies the relevant DRM of the allocated IVG, and provides the DRM with the parameters needed for creating the connection. Such parameters may comprise, for example, an IP address of the IVG. Typically, the MNG then communicates with the IVG and awaits its report of the investigation results. Once the investigation results are reported by the IVG, the MNG de-allocates the IVG and instructs the DRM to clear resources for the specific connection that was investigated. Then, the MNG may decide to indicate the investigation results to a user, e.g., an administrator of network 24. The indication may comprise, for example, an e-mail or SMS alert. The IVG may also provide the MNG with a detailed report regarding the detected attack. The report may comprise any suitable information, sometimes including a recording of the session.

In an embodiment, the IVG is implemented as a Virtual Machine (VM), and allocating an IVG may comprise accessing the virtual platform management for allocating the needed resources. In some embodiments and network configurations, the MNG assists the DRM in configuring switches 36 or otherwise configure the network, e.g., when the DRM does not have the appropriate permissions or access. In an embodiment, the MNG is implemented as a VM that can be allocated on any physical machine. Alternatively, however, the MNG may be implemented using software running on a dedicated server, for example.

Although the embodiments described herein mainly address detection and mitigation of malicious connection attempts, the methods and systems described herein can also be used in other applications, such as in detecting and correcting network misconfiguration.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for network security, comprising:
monitoring traffic exchanged over a computer network;
identifying in the monitored traffic that an attempt of an initiating computer to communicate with a target computer has failed, by performing one or more of:
(i) identifying that one or more requests of the initiating computer to communicate with the target computer were not acknowledged; and
(ii) identifying a packet that was sent to the initiating computer and notifies the initiating computer that the attempt has failed;
causing the initiating computer to regard the failed attempt as successful, by:
(i) sending from a security system to the initiating computer a fake acknowledgment to one or more of the requests to communicate with the target computer, wherein the fake acknowledgement comprises a positive reply that appears to originate from the target computer; and
(ii) preventing the packet that notifies the initiating computer that the attempt has failed from reaching the initiating computer;
redirecting the identified failed attempt to the security system, which continues to communicate with the initiating computer over an investigation connection while impersonating the target computer; and
verifying whether the failed attempt was malicious or innocent by communicating with the initiating computer over the investigation connection.

2. The method according to claim 1, wherein identifying the failed attempt comprises detecting that the attempt has been blocked by a network security system.

3. The method according to claim 1, wherein identifying the failed attempt comprises detecting that the attempt has failed for attempting to access a nonexistent destination.

4. The method according to claim 1, wherein identifying the failed attempt comprises detecting that the one or more requests were not acknowledged within a predefined time period.

5. The method according to claim 1, wherein identifying the failed attempt comprises detecting that the attempt has been retried.

6. The method according to claim 1, wherein identifying the packet sent to the initiating computer comprises detecting a connection-reset or port-unreachable message that has been sent in response to the attempt.

7. The method according to claim 1, wherein identifying that the one or more requests were not acknowledged comprises detecting an unanswered Address Resolution Protocol (ARP) request by the initiating computer.

8. The method according to claim 7, wherein redirecting the identified failed attempt comprises replying to the ARP request with an address of the security system that carries out the investigation connection.

9. The method according to claim 1, wherein identifying the failed attempt comprises receiving a notification of the failed attempt from a network security or management system of the computer network.

10. The method according to claim 1, wherein identifying the failed attempt comprises predicting that the attempt will fail before actual failure of the attempt.

11. A security system, comprising:
one or more interfaces, which are configured to connect to a computer network; and
one or more hardware processors, which are configured:
  to monitor traffic exchanged over the computer network;
  to identify in the monitored traffic that an attempt of an initiating computer to communicate with a target computer has failed, by performing one or more of:
    (i) identifying that one or more requests of the initiating computer to communicate with the target computer were not acknowledged; and
    (ii) identifying a packet that was sent to the initiating computer and notifies the initiating computer that the attempt has failed;
  to cause the initiating computer to regard the failed attempt as successful, by:
    (i) sending from the security system to the initiating computer a fake acknowledgment to one or more of the requests to communicate with the target computer, wherein the fake acknowledgement comprises a positive reply that appears to originate from the target computer; and
    (ii) preventing the packet that notifies the initiating computer that the attempt has failed from reaching the initiating computer;
  to redirect the identified failed attempt to the security system, which continues to communicate with the initiating computer over an investigation connection while impersonating the target computer; and
  to verify whether the failed attempt was malicious or innocent by communicating with the initiating computer over the investigation connection.

12. The system according to claim 11, wherein the processors comprise one or more Detection and Redirection Modules (DRMs) and an Investigation module (IVG), wherein the DRMs are configured to monitor the traffic, to identify the failed attempt and to redirect the identified attempt to the IVG, and wherein the IVG is configured to establish the investigation connection with the initiating computer, and to verify whether the failed attempt was malicious or innocent.

13. The system according to claim 12, wherein the one or more DRMs comprise a plurality of DRMs that are coupled to respective switches of the computer network.

14. The system according to claim 11, wherein the processors are configured to identify the failed attempt by detecting that the attempt has been blocked by a network security system.

15. The system according to claim 11, wherein the processors are configured to identify the failed attempt by detecting that the attempt has failed for attempting to access a nonexistent destination.

16. The system according to claim 11, wherein the processors are configured to identify the failed attempt by detecting that the one or more requests were not acknowledged within a predefined time period.

17. The system according to claim 11, wherein the processors are configured to identify the failed attempt by detecting that the attempt has been retried.

18. The system according to claim 11, wherein the processors are configured to identify the packet sent to the initiating computer by identifying a connection-reset or port-unreachable message that has been sent in response to the attempt.

19. The system according to claim 11, wherein the processors are configured to identify that the one or more requests were not acknowledged by detecting an unanswered Address Resolution Protocol (ARP) request by the initiating computer.

20. The system according to claim 19, wherein the processors are configured to redirect the identified failed attempt by replying to the ARP request with an address of an investigation unit that carries out the investigation connection.

21. The system according to claim 11, wherein the processors are configured to identify the failed attempt by receiving a notification of the failed attempt from a network security or management system of the computer network.

22. The system according to claim 11, wherein the processors are configured to predict that the attempt will fail before actual failure of the attempt.

* * * * *